Patented July 23, 1946

2,404,498

UNITED STATES PATENT OFFICE 2,404,498

PRODUCTION OF TOLUENE

Vladimir N. Ipatieff and George S. Monroe, Riverside, Ill., assignors to Universal Oil Products Company, Chicago, Ill., a corporation of Delaware No Drawing. Application March 27, 1944, Serial No. 528,345

7 Claims. (Cl. 260—671)

This invention relates to the production of toluene from benzene and methane in the presence of a catalyst and is more specifically concerned with the conversion of benzene and methane into substantial yields of toluene in the presence of a particular catalyst and under specific conditions of temperature and pressure.

Methane is obtained in abundance from natural gases or as a by-product of various hydrocarbon conversion processes such as cracking, reforming, etc. Heretofore, because in ordinary operation it is chemically inert, the primary uses of methane in industry has been for fuel, for the manufacture of carbon black or as an inert diluent in various hydrocarbon conversion processes to effect a lowering of the partial pressure of the reactants.

It is recognized that methane has been converted to methyl chloride and the methyl chloride employed as an alkylating agent to alkylate benzene in the presence of aluminum chloride to produce toluene and more highly alkylated benzenes. However, the preparation of the methyl chloride is expensive and for this reason, the process has not assumed any commercial importance.

It is an object of the present invention to provide a method for producing toluene from benzene and methane directly thereby obviating the necessity of forming expensive intermediate alkylating agents such as methyl chloride.

In one broad embodiment, the present invention comprises a process for producing toluene by subjecting a mixture of benzene and methane to contact with a catalyst comprising at least one substance selected from the group consisting of the metals having an atomic number of 26 to 29 inclusive and the oxides thereof.

In a more specific embodiment, the present invention comprises a process for producing toluene by subjecting a mixture of benzene and methane to contact with a catalyst comprising at least one substance selected from the group consisting of the metals having an atomic number of 26 to 29 inclusive and the oxides thereof at a temperature within the range of about 275° C. to about 450° C. and under superatmospheric pressure within the range of about 10 atmospheres to about 450 atmospheres.

As previously set forth, the catalysts useful in the process of the present invention comprise metals having an atomic number of 26 to 29 and include nickel, cobalt, iron, copper and the oxides thereof. These catalysts can be used alone or in admixture with one another or composited with refractory carriers such as natural-occurring siliceous or aluminiferous materials or synthetically prepared supports.

Natural-occurring supporting materials will include kieselguhr, acid-treated clays, bauxite and similar substances. Synthetic carriers may comprise silica, alumina, thoria and similar refractory materials. The various catalysts produced by compositing the above refractory carriers and the active metals or metal oxides are not necessarily equivalent in their ability to accelerate the desired reaction. The activity of each catalyst will be dependent to a certain extent upon the particular metal or metal oxide and carrier chosen. A particularly active catalyst comprises a composite of metallic nickel, nickel oxide and kieselguhr. A detailed method of preparing this catalyst is given hereinafter in this specification.

The carrier materials may be obtained by a number of methods, some of which are hereinafter set forth:

In regard to the production of alumina, it may be stated that three hydrated oxides of aluminum occur in nature, to wit, hydrargillite or gibbsite, bauxite, and diaspore. Of these three minerals the corresponding oxides from the trihydrated and dihydrated minerals are suitable for the manufacture of the present types of catalysts and these materials have furnished types of activated alumina which are entirely satisfactory. Precipitated trihydrates can also be dehydrated at moderately elevated temperatures to form satisfactory types of alumina. Crystallographically and X-ray spectroscopically, this most satisfactory type of alumina is referred to as gamma-alumina crystallizing in the cubic system, the length of edge of the unit cube being about 7.9 Angstrom units.

It is best practice in the final steps of preparation of aluminum oxides for use in the catalyst composites to ignite them for some time at temperatures within the approximate range of 500° to 600° C. This does not correspond to complete dehydration of the hydrated oxides but gives catalytic materials of good strength and porosity so that they are able to resist for a long time the deterioration effects of the service and the reactivation periods to which they are subjected. Aluminas having the physical characteristics of "activated alumina" of commerce are well adapted for use as a support for these catalysts.

Silica suitable for compositing with activating oxides to produce catalysts may be obtained conveniently by precipitating silica gel from a solution of a water soluble silicate by the addition of an aqueous solution of a mineral acid followed by washing to remove water soluble salts and drying to produce a granular material comprising essentially silica.

Thoria utilized in the production of dehydrogenating catalysts may be obtained by known methods from a number of minerals including thorite, orangite, and thorianite.

The catalyst may be prepared employing various procedures; for example, the prepared refractory material such as calcined silica, alumina or thoria or natural-occurring siliceous material such as kieselguhr may be suspended in aqueous solutions of soluble salts of the various metals and the entire solution evaporated to dryness. The residue may then be dried and calcined to decompose the salt deposited thereon to form the oxide of the metal. This composite may be further treated with a reducing gas such as hydrogen or carbon monoxide to convert the oxide into the metal, said reduction forming a very active catalyst. The extent of reduction can be varied so that the final catalyst is a composite of refractory carrier, metal and metal oxide.

Another procedure which may be employed for manufacturing the catalyst consists of suspending the hydrogel of the refractory carrier such as silica or alumina hydrogel in an aqueous solution of the metal salt followed by drying and calcining and the reduction as set forth above.

Still another method may comprise impregnating the prepared refractory carriers by immersing the carrier for a short time in a solution of a soluble salt again followed by the calcination and reduction operations. Although all the catalysts mentioned herein possess activity for the disclosed reaction, it is not intended to infer that they are the equivalent in their ability to accelerate the interaction of benzene and methane.

The general method of preparation of a nickel-kieselguhr catalyst involves the following steps: Kieselguhr is suspended in a relatively dilute aqueous solution of nickel sulfate and a saturated hot solution of sodium carbonate is added gradually with constant agitation. The proportions of kieselguhr, nickel sulfate and sodium carbonate being chosen so that after washing, drying the precipitate and reduction with hydrogen, the desired composition is obtained. The primary precipitate consists of kieselguhr, nickel carbonate, and nickelous hydroxide. This precipitate is then dried and mixed with about 4% of its weight of powdered graphite and pelleted into small cylindrical forms in any standard type operating machine. The formed pellets that still contain a mixture of carbonate and hydroxide are then heated in a stream of air or nitrogen to eliminate carbon dioxide. After the requisite amount of carbonate decomposition has been effected, reduction of the nickel oxide is conducted at increasing temperatures in a stream of hydrogen until a temperature of approximately 425° C. is reached. The weight per cent of nickel which may be incorporated in the composite catalyst will vary from about 20 to about 95% and preferably within the range of about 60 to about 90 weight per cent.

As previously stated, methane is ordinarily considered chemically inert. However, we have discovered that in the presence of the catalyst previously described and under selected conditions of operation, toluene can be produced from a mixture of benzene and methane.

The procedure preferably utilized for effecting methylation of benzene, according to the process of this invention, consists in passing a mixture of benzene and methane over a fixed bed of catalyst maintained at a temperature from about 275 to 450° C. under a pressure of from about 10 to about 450 atmospheres. The reaction mixture undergoing treatment preferably contains between about 2 and about 20 molecular proportions of methane per one molecular proportion of benzene in order to favor production of toluene and to diminish the reactions which result in the formation of diphenyl and alkylated diphenyl which are valuable products although not preferred products of the present process.

The reaction may also be conducted in a fluidized or moving-bed type of operation wherein the reactants are introduced into a bed of finely divided catalyst at sufficient velocity such that the catalyst particles are motionalized to form a catalyst bed resembling a liquid in appearance. The reaction products are withdrawn from the catalyst zone, entrained catalyst separated therefrom recycled to the reaction zone. The reaction products are then passed through suitable fractionating systems wherein the desired products are separated from the unconverted material and the latter recycled to the reaction zone.

In the compact moving-bed type of operation, a compact bed of finely divided catalysts may be passed through the reaction zone either counercurrent or concurrent with the hydrocarbon reactants, the reaction products withdrawn from the reaction zone into a suitable separation system and the spent catalyst passed into a regeneration zone in which it is reactivated and recycled to the reaction zone.

The catalyst after continued use accumulates a deposit of carbonaceous materials which impair the catalyst activity. The regeneration of the catalyst may be accomplished by combustion in the presence of regulated quantities of oxygen or oxygen-containing gases.

Another method of regeneration consists of subjecting the carbonaceous deposit to contact with high pressure hydrogen which hydrogenates the deposit to form hydrocarbons which are thereafter easily removed from the catalyst surface.

In case there is considerable sulfur present on the catalyst, this hydrogenation treatment will convert the sulfur to hydrogen sulfide which is subsequently separated along with the effluent from the regeneration zone. In general, the products formed during treatment of mixtures of benzene and methane with a dehydrogenating catalyst are separated from the unreacted benzene and methane by suitable means as by distillation and the unreacted portions of the benzene and methane recycled and commingled with additional quantities of these hydrocarbons being charged to the catalyst zone. Hydrogen or hydrogen-containing gases produced in the process may also be recycled with the recovered benzene and methane. The reaction product boiling higher than benzene is separated into desired fractions or individual compounds including toluene and diphenyl by distillation at ordinary or reduced pressure or by other suitable means. The following examples are given to illustrate the character of results obtained by the use of the present process although the data presented are not introduced with the intention of unduly limiting the generally broad scope of the invention.

EXAMPLE 1

About 72.8 grams of benzene and 31.2 grams of methane were charged along with 7.2 grams of reduced nickel kieselguhr catalyst into a rotating autoclave of about 330 cc. capacity. The autoclave was heated to 400° C. and held at this temperature for 4 hours. The maximum pressure reached in the autoclave was 7500 pounds per square inch. The autoclave was allowed to cool to approximately room temperature and the products removed therefrom. The hydrocarbons were separated from the catalyst and subjected to fractional distillation. The hydrocarbon products had the following analysis:

| | Per cent |
|---|---|
| Unreacted benzene | 74.5 |
| Alkylate (chiefly toluene) | 20.9 |
| Naphthenes | 0.6 |
| Residue, no tar-naphthalene derivative | 4.0 |
| Total | 100.0 |

The following table presents the results obtained in Examples 2 to 6 inclusive. These results were obtained in a continuous operation in which a pelleted nickel-kieselguhr catalyst was disposed in fixed bed relationship to the incoming reactants.

Table

| | Example No. | | | | |
|---|---|---|---|---|---|
| | 2 | 3 | 4 | 5 | 6 |
| Operating conditions: | | | | | |
| Temp., ° C | 372 | 348 | 370 | 351 | 366 |
| Pres. #/sq. " | 8,000 | 6,000 | 6,000 | 4,000 | 1,000 |
| Mols $C_6H_6$ per mol of $CH_4$ | 0.4 | 0.6 | 0.5 | 0.5 | 0.6 |
| Products wt. per cent of total charge: | | | | | |
| Methane | 41.0 | 30.7 | 36.2 | 31.7 | 28.1 |
| Toluene | 8.6 | 5.3 | 5.6 | 5.7 | 4.5 |
| Higher HC | 1.5 | 1.4 | 1.6 | 1.5 | 1.4 |
| Benzene (recov.) | 48.0 | 62.0 | 55.8 | 60.0 | 63.7 |
| Carbon | 0.9 | 0.6 | 0.8 | 1.0 | 2.3 |
| | 100.0 | 100.0 | 100.0 | 100.0 | 100.0 |

We claim as our invention:

1. A process for producing toluene which comprises subjecting a mixture of benzene and methane to contact with a catalyst comprising at least one substance selected from the group consisting of the metals having an atomic number of 26 to 29 inclusive and the oxides thereof at a temperature within the range of about 275° C. to about 450° C. and under superatmospheric pressure within the range of about 10 atmospheres to about 450 atmospheres.

2. A process for producing toluene which comprises subjecting a mixture of benzene and methane to contact with a catalyst comprising a refractory carrier and at least one substance selected from the group consisting of the metals having an atomic number of 26 to 29 inclusive and the oxides thereof at a temperature within the range of about 275° C. to about 450° C. and under superatmospheric pressure within the range of about 10 atmospheres to about 450 atmospheres.

3. A process for producing toluene which comprises subjecting a mixture of benzene and a molar excess of methane to the action of a catalyst comprising at least one substance selected from the group consisting of the metals having an atomic number of 26 to 29 inclusive and the oxides thereof at a temperature within the range of about 275° C. to about 450° C. and under a pressure within the range of about 10 atmospheres to about 450 atmospheres.

4. A process for producing toluene which comprises subjecting a mixture of benzene and methane to the action of a catalyst comprising nickel and kieselguhr at a temperature within the range of about 275° C. to about 450° C. and under a pressure within the range of about 10 atmospheres to about 450 atmospheres.

5. A process for producing toluene which comprises subjecting a mixture of benzene and methane to the action of a catalyst comprising nickel at a temperature within the range of about 275° C. to about 450° C. and under a pressure within the range of about 10 atmospheres to about 450 atmospheres.

6. A process for producing toluene which comprises subjecting a mixture of benzene and methane to the action of a catalyst comprising iron at a temperature within the range of about 275° C. to about 450° C. and under a pressure within the range of about 10 atmospheres to about 450 atmospheres.

7. A process for producing toluene which comprises subjecting a mixture of benzene and methane to the action of a catalyst comprising cobalt at a temperature within the range of about 275° C. to about 450° C. and under a pressure within the range of about 10 atmospheres to about 450 atmospheres.

VLADIMIR N. IPATIEFF.
GEORGE S. MONROE.